(12) United States Patent
Skerlos et al.

(10) Patent No.: US 8,167,092 B2
(45) Date of Patent: *May 1, 2012

(54) METALWORKING LUBRICANT FORMULATIONS BASED ON SUPERCRITICAL CARBON DIOXIDE

(75) Inventors: Steven J. Skerlos, Ann Arbor, MI (US); Kim F. Hayes, Ann Arbor, MI (US); Andres F. Clarens, Washington, DC (US)

(73) Assignee: The Regents of The University of Michigan, Ann Arbor, MI (US)

( * ) Notice: Subject to any disclaimer, the term of this patent is extended or adjusted under 35 U.S.C. 154(b) by 549 days.

This patent is subject to a terminal disclaimer.

(21) Appl. No.: 12/185,033

(22) Filed: Aug. 1, 2008

(65) Prior Publication Data
US 2008/0293599 A1 Nov. 27, 2008

Related U.S. Application Data

(63) Continuation of application No. 11/415,492, filed on Apr. 28, 2006, now Pat. No. 7,414,015.

(60) Provisional application No. 60/676,531, filed on Apr. 29, 2005.

(51) Int. Cl.
*F01M 1/00* (2006.01)
*C10M 125/00* (2006.01)

(52) U.S. Cl. ..................................... 184/6.26
(58) Field of Classification Search .................. 508/154, 508/469, 577; 184/6.26
See application file for complete search history.

(56) References Cited

U.S. PATENT DOCUMENTS

| | | | | |
|---|---|---|---|---|
| 5,603,655 A * | 2/1997 | Kaneko et al. | ............... | 451/450 |
| 5,652,201 A * | 7/1997 | Papay et al. | .................. | 508/228 |
| 6,099,937 A * | 8/2000 | Gui et al. | ....................... | 428/141 |
| 6,306,803 B1* | 10/2001 | Tazaki | .......................... | 508/539 |
| 6,334,266 B1* | 1/2002 | Moritz et al. | ................... | 34/337 |
| 6,547,497 B2 | 4/2003 | Löf et al. | | |
| 6,875,285 B2* | 4/2005 | Wang et al. | ...................... | 134/2 |
| 2002/0035043 A1 | 3/2002 | Yokota et al. | | |
| 2007/0148356 A1 | 6/2007 | Russell et al. | | |
| 2007/0265174 A1 | 11/2007 | Schlenoff | | |

FOREIGN PATENT DOCUMENTS

JP  2005060473      3/2005
JP  2005060473 A *  3/2005

OTHER PUBLICATIONS

ASTM American Society for Testing Materials, "Standard Test Method for Comparing Metal Removal Fluids Using the Tapping Torque Test Machine," D 5619-00, 2005, West Conshohocken, PA.
Bennett, E. O., D. L. Bennett, "Minimizing Human Exposure to Chemicals in Metalworking Fluids," Lubrication Engineering, Mar. 1987, vol. 43, 3, pp. 167-175.

(Continued)

*Primary Examiner* — Jim Goloboy
(74) *Attorney, Agent, or Firm* — Dierker & Associates, P.C.

(57) ABSTRACT

A method for lubricating a metal workpiece during a metalworking process includes delivering supercritical carbon dioxide to the workpiece during the metalworking process. The supercritical carbon dioxide acts as a lubricant, coolant, chip evacuator, and/or carrier for another lubricant or corrosion inhibitor.

12 Claims, 3 Drawing Sheets

OTHER PUBLICATIONS

Clarens, A. F., Zimmerman, J. B., Landis, H. R., Hayes, K. F., Skerlos, S. J., "Experimental Comparison of Vegetable and Petroleum Base Oils in Metalworking Fluids using the Tapping Torque Test," Proceedings of the Japan/USA Symposium on Flexible Automation, Denver, Colorado, Jul. 19-21, 2004 (6 pages).

DeSimone, J. M., "Practical Approaches to Green Solvents," Science, Aug. 2002, vol. 297, pp. 799-803.

DeSimone, J. M. and J. S. Keiper, "Surfactants and self-assembly in carbon dioxide," Current Opinion in Solid State and Materials Science, 2001, 5, pp. 333-341.

Diefenbacher, A., M. Türk, "Phase equilibria of organic solid solutes and supercritical fluids with respect to the RESS process," J. of Supercritical Fluids, 2002, 22, pp. 175-184.

Goyan, R. L., R. E. Melley, P. A. Wissner, W. C. Ong, "Biodegradable Lubricants," Lubrication Engineering, Jul. 1998 7, pp. 10-17.

McClain, J. B., D. E. Betts, D. A. Canelas, E. T. Samulski, J. M. DeSimone, J. D. Londono, H. D. Cochran, G. D. Wignall, D. Chillura-Martino, R. Triolo, "Design of Nonionic Surfactants for Supercritical Carbon Dioxide," Science, Dec. 1996, 274, pp. 2049-2052.

Skerlos, S. J., R. E. DeVor. S. G. Kapoor, "Environmentally Conscious Disposal Considerations in Cutting Fluid Selection," ASME International Mechanical Engineering Congress and Exposition, Proceedings of the ASME: Manufacturing Science and Engineering Division, Anaheim, CA, 1998, vol. 8, pp. 397-403.

Wells, S. L., J. DeSimone, "$CO_2$ Technology Platform: An Important Tool for Environmental Problem Solving," Angew. Chem. Int. Ed., 2001, vol. 40, pp. 518-527.

Westerman, D., R. C. D. Santos, J. A. Bosley, B. Al-Duri, Extraction of Amaranth Seed Oil by Supercritical Carbon Dioxide, J. of Supercritical Fluids, 2006, vol. 37, pp. 38-52.

Zimmerman, J. B, S. Takahashi, K. F. Hayes, S. J. Skerlos, "Experimental and Statistical Design Considerations for Economical Evaluation of Metalworking Fluids Using the Tapping Torque Test," Lubrication Engineering, Mar. 2003, vol. 59, No. 3, pp. 17-24.

Zimmerman, J. B, K. F. Hayes, S. J. Skerlos, "Influence of Ion Accumulation on the Emulsion Stability and Machining Performance of Semi-Synthetic Metalworking Fluids", Environmental Science and Technology, 2004, vol. 38, pp. 2482-2490.

International Search Report for S.N. PCT/US2006/16324 dated Jun. 19, 2007 (3 pages).

* cited by examiner

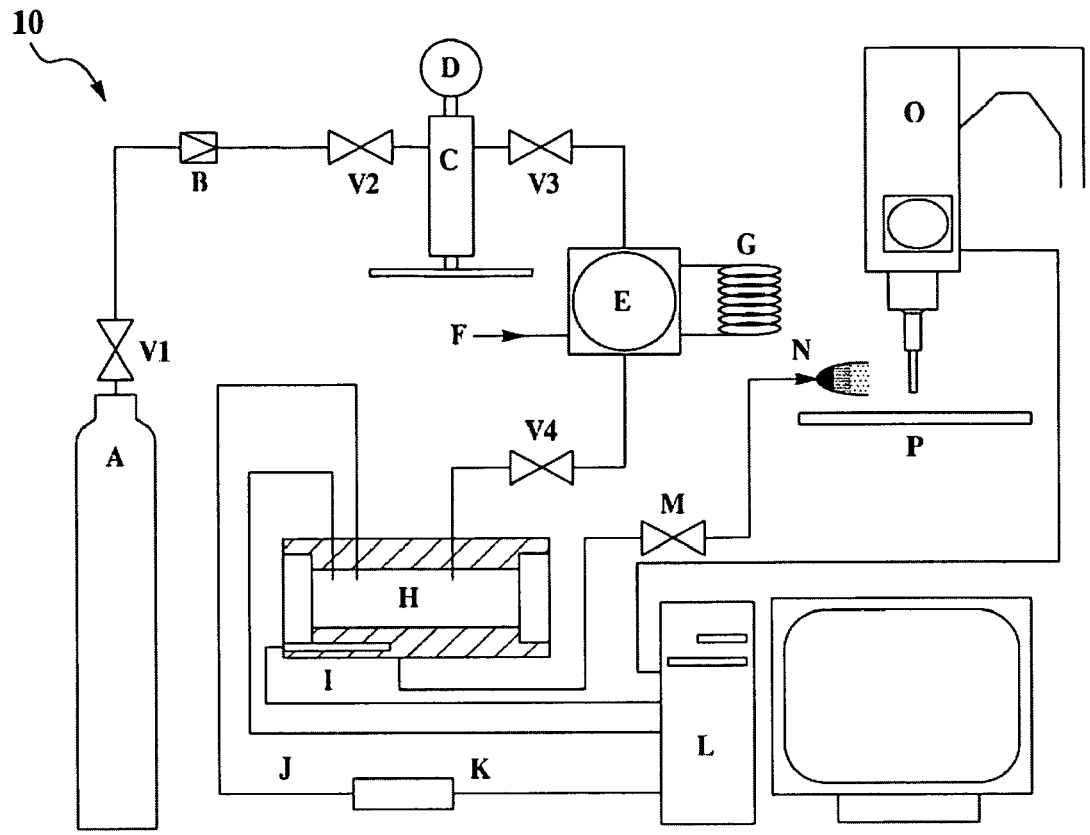
FIG. 1
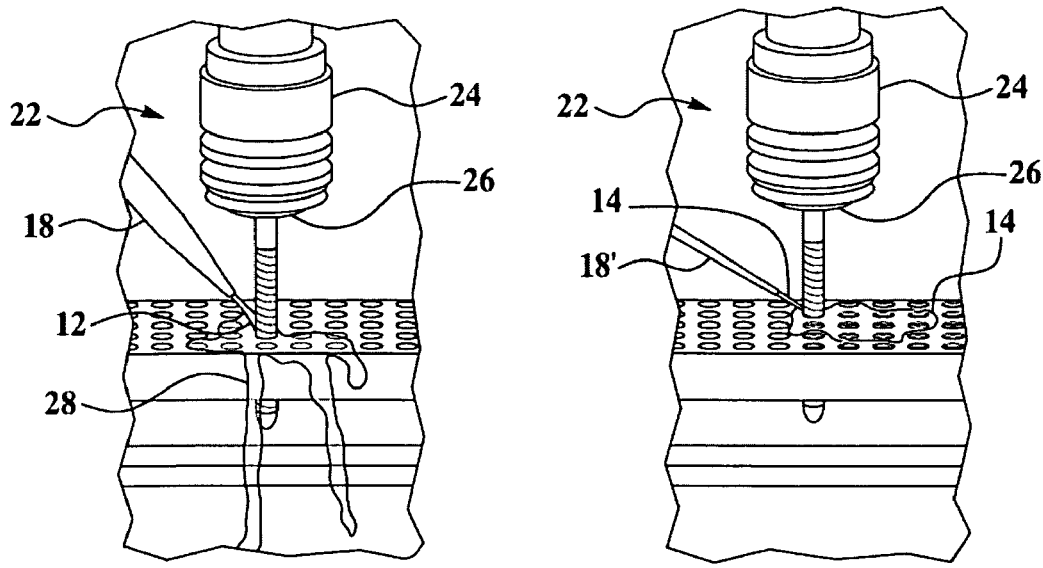
FIG. 2A  FIG. 2B

METALWORKING LUBRICANT FORMULATIONS BASED ON SUPERCRITICAL CARBON DIOXIDE

CROSS REFERENCE TO RELATED APPLICATIONS

The instant application is a continuation of U.S. patent application Ser. No. 11/415,492, filed Apr. 28, 2006 now U.S. Pat. No. 7,414,015, which itself claims the benefit of U.S. Provisional Patent application Ser. No. 60/676,531 filed on Apr. 29, 2005, each of which is incorporated herein by reference in its entirety.

STATEMENT REGARDING FEDERALLY SPONSORED RESEARCH OR DEVELOPMENT

This invention was made in the course of research supported by a grant from the National Science Foundation (NSF), Grant No. DMII 0093514; and from the National Science Foundation (NSF)/Environmental Protection Agency (EPA), Grant No. RD 83134701. The U.S. Government has certain rights in the invention.

BACKGROUND

The present disclosure relates to metalworking, and more particularly to lubricants for metalworking.

Metalworking Fluids (MWFs) lubricate and cool metal during various metalworking processes (some non-limitative examples of which include cutting processes, forming processes, etc.) and are useful for proper process function. Specifically, MWFs increase tool life, substantially ensure proper surface finish, permit faster manufacturing rates, and reduce energy consumption during machining. They are typically oil in water emulsions, where the oil lubricates and the water cools the cutting zone. However, the mixture of oil and water has the potential to make MWFs an environmental and occupational health concern. This may be due, at least in part, to the metals, organic constituents, and microorganisms that may accumulate in these fluids and to the aerosols that may form when they are sprayed in large excess onto machining processes. The aerosols that may form from these oily solutions reduce the air quality in the workplace and may, in some cases, potentially have acute and/or chronic skin and lung impacts on workers. The oil in water emulsions tend to degrade over time as a result of microbial attack and hard water ion accumulation, which may pose a waste treatment problem, particularly if the mixture contains toxic additives. Thus, the MWFs may become a hazardous waste problem when they reach the end of their useful life. Many environmental and health concerns potentially associated with MWFs may be substantially eliminated if the lubrication could be provided in minimal quantity using a solvent other than water.

As such, it would be desirable to provide metalworking lubrication in the minimal necessary quantity using a non-water solvent. Such an alternative solvent may advantageously reduce or eliminate the problems associated with water-based MWFs and, subsequently, the need for traditional MWF maintenance or treatment systems such as pumps and separation systems. Further, delivery of minimal quantity lubrication may conserve resources, maintain more consistent high quality process operation, and reduce life cycle emissions, while substantially aiding in removal of health risks and spoilage concerns potentially associated with traditional water-based MWFs.

SUMMARY

A method for lubricating a metal workpiece during a metalworking process includes delivering supercritical carbon dioxide to the workpiece during the metalworking process. The supercritical carbon dioxide acts as a lubricant, coolant, chip evacuator, and/or carrier for another lubricant or corrosion inhibitor.

BRIEF DESCRIPTION OF THE DRAWINGS

Objects, features and advantages of embodiments of the present disclosure will become apparent by reference to the following detailed description and drawings, in which:

FIG. 1 is a schematic diagram showing an experimental setup incorporating an embodiment of the present disclosure;

FIG. 2A is a photograph of a tapping torque test using water-based MWFs;

FIG. 2B is a photograph of a tapping torque test using $scCO_2$-based MWFs according to embodiment(s) of the present disclosure;

DETAILED DESCRIPTION OF THE EMBODIMENTS

Figure 3:
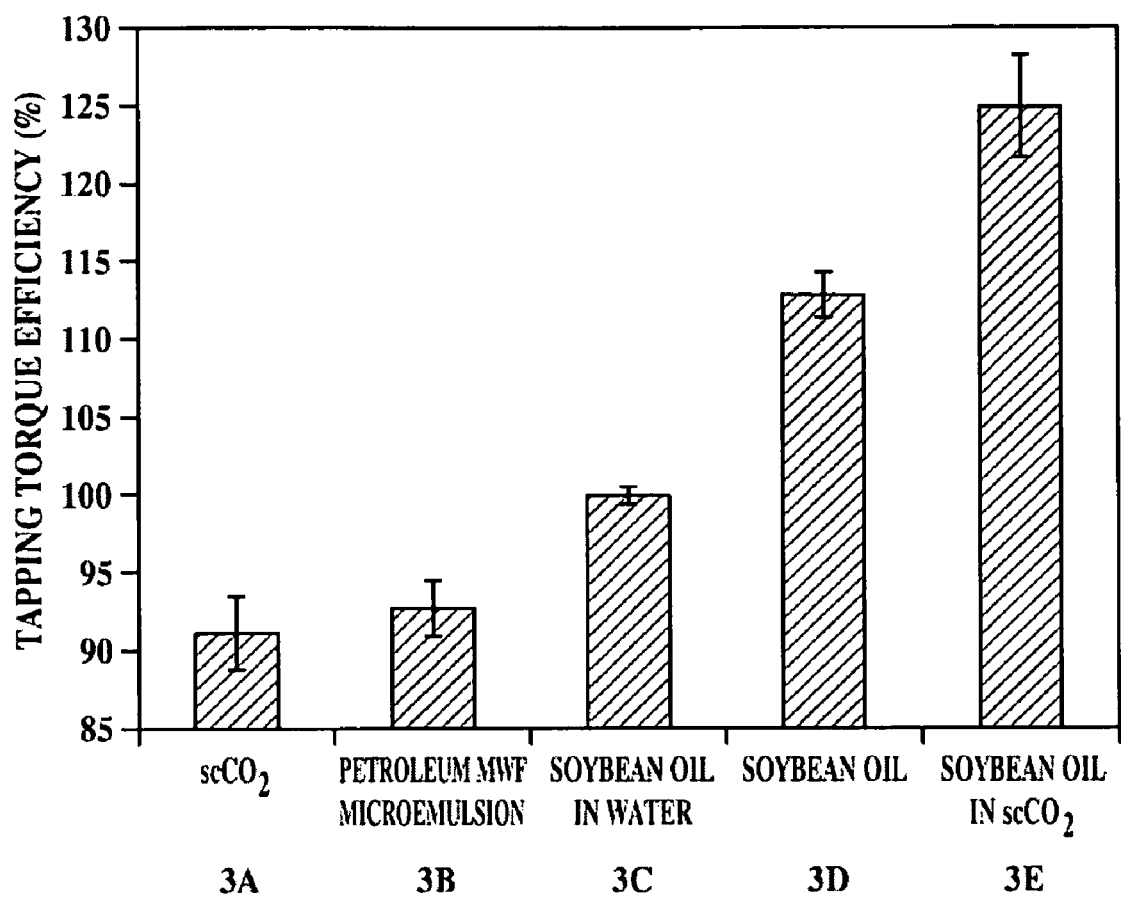
FIG. 3 is a chart depicting tapping torque efficiency for the following water-based MWFs and $scCO_2$-based MWFs: $scCO_2$ alone (3A); petroleum MWF microemulsion (3B); soybean oil MWF microemulsion (3C); soybean oil alone (3D); and soybean oil in $scCO_2$ (3E)

The present inventors have unexpectedly and fortuitously found that supercritical carbon dioxide ($scCO_2$) may be used as an effective lubricant and lubricant carrier in metalworking processes/operations, such as, e.g., cutting and forming. Further, $scCO_2$ provides better basic lubricity in metalworking than does water and $scCO_2$ alone has been found to have lubricity substantially similar to that of basic semi-synthetic metal working fluids (MWFs), at least in one machining application. Lubricants such as straight oils, i.e. oils without the addition of water, are among the best known lubricants for most processes. Yet, the present inventors have also found that the combination of $scCO_2$ and lubricants is advantageously synergistic, i.e. the lubricity measured from the combination provides substantially better lubricity than the lubricity of either when measured alone. This has also been found to be true even if less oil is applied to the system when delivered in $scCO_2$. For example, improved performance has been found (with the $scCO_2$ delivery system) comparing the same oil with and without the $scCO_2$ delivery system but, advantageously, those improved results have been found with lesser amounts of the same oil when used with the scCO$_2$ delivery system. Still further, the present inventors also contemplate that method(s) according to embodiment(s) herein may also advantageously clear chips (chip evacuation) during cutting processes, reduce tool wear, provide corrosion resistance, and improve surface finish in certain systems.

Although supercritical CO$_2$ is becoming an important constituent in the pharmaceutical industry and semiconductor industry, and in chemical engineering extraction processes, etching processes, and cleaning processes, to date scCO$_2$ has not been shown to have advantageous use in the metalworking industry. As shown herein, scCO$_2$ lubricants and/or scCO$_2$-based lubricant fluids may be added to a cutting region in substantially controlled quantities, thereby improving efficiency and recovery, and reducing the amount of raw materials needed to make the fluids. Thus, the use of scCO$_2$ may be seen as a new class of micro-/nano-lubrication technology that may be compatible with all metal cutting and forming operations. It is also within the purview of the present disclosure to add more oil (i.e. not limited to micro-/nano-lubrication) to the metalworking zone, if desired.

Still further, novel dispensing method(s) as disclosed herein substantially create a supercooling effect (e.g. via dry ice), in addition to the substantially enhanced delivery of lubricants (when one or more additional lubricant(s), e.g., oil, are used as the lubricant in conjunction with the scCO$_2$). For machining operations in which the cooling requirements are greater than those met using the dry ice cooling, the scCO$_2$ system may optionally be coupled with a spray of compressed air or nitrogen or other inert gas as a pressure released cooling spray to provide additional cooling.

It is to be understood that, when the supercritical CO$_2$ formulation(s) of the present embodiment(s) reach the metalworking zone, they are no longer supercritical; yet the lubricant(s) are very finely dispersed and thus able to reach the metalworking zone (e.g. cutting zone) better than it/they otherwise could had the formulation not originally been supercritical. The greater pressure release also generally leads to more cooling per mass of lubricant delivered than with non-supercritical formulations.

As described more fully herein, it is to be understood that the present disclosure is not intended to be limited to any machining and/or forming operations; i.e. the tapping process described is but one example of many machining operations for which embodiment(s) of the present compositions are contemplated as being useful. Further, it is to be understood that the present disclosure is not intended to be limited to any single formulation/composition of the lubricants of the present embodiment(s). It is contemplated as being within the purview of the present disclosure that, in addition to scCO$_2$ alone, many oils, esters, fatty acids, flourinated oils, block co-polymers, surfactants, ionic liquids, and other compounds may be suitable for use in scCO$_2$-based lubricants of the present embodiment(s), either as oils dissolved or dispersed in scCO$_2$, or emulsified using surfactants designed for emulsification in CO$_2$ systems. It is also contemplated as being within the purview of the present disclosure that secondary additives may optionally be added to lubricants of the present embodiment(s). Some classes of secondary additives that are generally useful in metal machining operations are corrosion inhibitors, extreme pressure additives, boundary lubricants, and/or antiwear additives, recognizing that some types within these individual classes may not be soluble in CO$_2$ and, thus, may not be useful for this application. Yet further, it is to be understood that the method(s) and compositions/formulations of the present embodiment(s) may be useful for metal cutting (non-limitative examples of which include drilling, boring, turning, milling, tapping, broaching, thread forming, planing, shearing, punching, reaming, and/or the like), as well as for metal forming (non-limitative examples of which include stamping, drawing, rolling, extruding, forging, and/or the like).

As used herein, the term "metalworking" is meant to encompass all metal working operations, examples of which are metal cutting and metal forming. "Cooling," "coolant," or like terms are meant to encompass the phenomenon of cooling of the metal workpiece due, at least in part, to rapid expansion of the carbon dioxide at/adjacent the nozzle. The lubricant composition(s)/formulation(s) described herein are meant to include any such lubricants, in addition to scCO$_2$ itself, that are dissolved and/or dispersed and/or emulsified by any suitable means in scCO$_2$.

As discussed in more detail hereinbelow, the SEM images shown in FIGS. 4a-4e and the tapping torque data shown in FIG. 3 are well correlated. The ground surfaces are indicative of higher friction; higher friction equates with higher torque; and higher torque equates with lower tapping torque efficiency. The comparison of FIG. 3 and FIGS. 4a-4e clearly shows this relationship. As such, from the data shown herein, it may be seen that the tapping torque efficiency is a reliable indicator of lubricity potential.

Further, method(s) of embodiment(s) herein also advantageously clear chips (chip evacuation) during cutting processes, thereby allowing deeper penetration of the lubricant(s) of the present embodiments. Such chip evacuation may be due, at least in part, to the pressure of the present method(s). It is to be understood that the deeper penetration of lubricant(s) may also be due to the very fine dispersion and high pressure of the carbon dioxide release, allowing very small droplets to reach deeper into the cutting and chip evacuation zones. Additionally, scCO$_2$ has a lower surface tension than water and is known to reduce the surface tension of fluids in which it is dissolved, further increasing the penetrating ability of lubricants delivered in CO$_2$.

Several vegetable-based formulations have been developed as alternatives to petroleum-based formulations. The tapping torque test is used to compare the performance of the new vegetable- and/or scCO$_2$-based lubricants to the petroleum- and water-based MWFs used today. It is believed that the data presented herein are the first to demonstrate the feasibility of CO$_2$-based MWFs.

Vegetable oils are desirable for use in MWF applications because they come from renewable feedstocks (which reduces dependence on foreign oil), they are less toxic during use and at the end-of-life, and they have been shown to be more stable and easier to recycle under field conditions. They may also be particularly suitable for medical applications (e.g. machining of medical products) since substantially no toxic materials are used, as well as for traditional operations. Vegetable oils have also been shown to be better lubricants than mineral oils. In addition, CO$_2$ is sequestered when the vegetable feedstocks are grown. While numerous feedstocks are available on the market, three common vegetable-based oils and two common petroleum-based oils were selected as illustrations for the experiments described herein. They are: naphthenic mineral oil, a 50/50 blend of naphthenic and paraffinic mineral oil, soybean oil, canola oil (75% oleic content), and a TMP Ester (a polyol ester made by reacting a mixture of nC8 and nC10 fatty acids with trimethylolpropane may be referred to as a "TMP" ester). The five oils were tested as straight oils, and as soluble oil and semi-synthetic MWFs, to understand the impacts of emulsification on base oil performance. Machining performance was evaluated using a modification to the standard tapping torque test (ASTM D 5619). MWF performance is expressed relative to a commercially available MWF using the metric "tapping torque efficiency." Higher efficiency indicates improved performance in the tapping torque test and has been shown to be a suitable metric for field performance (as discussed in further detail below).

Over 25 tapping torque experiments were conducted for each test fluid to establish a statistical estimation of the experimental error. The results indicate that as straight oils, all vegetable-based stocks perform significantly better than the mineral oils. This trend holds, although is much less pronounced, after the vegetable stocks are emulsified into soluble oil and semi-synthetic MWFs. The results also indicate that some vegetable oil-based stocks have a higher potential for lubricity than others, with data revealing that the soybean and TMP ester provide improved tapping torque efficiency relative to canola oil in emulsified MWFs. It is to be understood that the above experiments were run to show that vegetable-based MWFs (not formulated in $scCO_2$) perform as well or better than petroleum-based MWFs.

The research also produced stable dispersions of $scCO_2$ and soybean oil that can be utilized as MWFs. These dispersions can be sprayed on the cutting zone to apply lubricity locally with controlled quantity. In addition to providing lubrication, the rapidly expanding $CO_2$ provides superior cooling ability relative to water. Furthermore, the pressure release of $CO_2$ also provides a chip evacuation function previously achieved using water as the carrier for working constituents of the MWF.

The supercritical temperature and pressure of $CO_2$ (Tc=31.1° C. and Pc=72.8 atm) is easily achieved in industrial environments. Under these conditions, $CO_2$ is a good solvent for many materials, and it is to be noted that some vegetable-based oils are highly soluble in $CO_2$.

To test the feasibility of $scCO_2$-based MWFs, a dispersion of soybean oil in $scCO_2$ was developed and tested using the tapping torque method relative to soybean oil MWF microemulsion. FIG. 1 illustrates an embodiment of an experimental setup 10 incorporating an embodiment of the present disclosure. It is to be understood that this is a non-limitative embodiment, and that some of the elements listed below may not be necessary and/or additional elements may be added, if desired. In FIG. 1, letter A represents a tank of food-grade carbon dioxide (Cryogenic Gases, MI); letter B represents a check valve; letter C represents a pressure booster (High Pressure Equipment, PA); letter D represents a pressure gauge; letter E represents a six-way valve (Valco Instruments, TX); letter F represents an oil inlet; letter G represents a fixed volume coil; letter H represents a high-pressure vessel; letter I represents a heating element; letter J represents a thermocouple (Omega, Stamford, Conn.); letter K represents a pressure transducer (Zook Enterprises, OH); letter L represents a computer; letter M represents a solenoid valve (Clark Cooper, NJ); letter N represents a nozzle; letter O represents a tapping torque machine; letter P represents a steel work piece; and letters V1-V3 represent pin valves.

In an embodiment of the setup 10, $CO_2$ from tank A may be pressurized to supercritical pressures by pressure booster C. Oil via inlet F may be added to the pressurized $CO_2$ using the valve E, which may be any suitable valve or device. The mixture of pressurized $CO_2$ and oil may then pass into vessel H, which may be any device suitable to contain the pressurized mixture. Oil may exit the vessel H and pass through a solenoid valve M before being sprayed out of nozzle N and onto the metalworking region, such as a steel work piece P in a tapping torque machine O.

The computer L, which may be any suitable computing device, may be used to control actuation of the solenoid valve M and/or to record data from the tapping torque machine O. The computer L may also be used to monitor/control operating/environmental conditions inside vessel H. The computer L may receive temperature data from the thermocouple J and/or pressure data from a pressure-sensing device. The computer L may be in communication with a heating element I and a pressure transducer K, both of which may be in communication with the vessel H, whereby if the temperature or pressure inside the vessel H falls outside a predetermined range, the computer directs the heating element I and/or the pressure transducer K to correct the environmental conditions to correspond with the predetermined range.

In another embodiment of an experimental setup 10, oil may be added to, and mixed with pressurized $CO_2$ in the vessel H instead of, or in addition to oil added via the oil inlet F to valve E. In such an embodiment, a stir-bar may be included in vessel H to facilitate mixing of the $CO_2$ and oil.

FIG. 2A illustrates a tapping torque test using water-based MWFs 12 delivered via nozzle 18, and FIG. 2B shows the same test utilizing $scCO_2$-based MWFs 14 delivered via nozzle 18'. The tapping torque test of FIGS. 2A and 2B is performed with a tapping torque test tool 22 having a lock nut 24 and a specimen nut 26. Excess water-based MWF 28 is visible in FIG. 2A, whereby the test shown in FIG. 2B using scCO2-based MWF 14 generally has no such excess fluid. It is to be understood that the test illustrated in FIG. 2B may provide greater lubrication and potential to reduce application rates while delivering less fluid 14 volume to the metalworking region.

The chart of FIG. 3 illustrates tapping torque efficiency for water-based MWFs and $scCO_2$-based MWFs. The results show that soybean oil in $scCO_2$ (3E) performs roughly 20% better than a soybean oil MWF microemulsion (3C), as discussed further hereinbelow. The dramatic increase in performance observed reached a level of performance in the tapping torque test previously not observed. Although $CO_2$ is inexpensive, nonflammable, environmentally benign, and can be easily removed from products, it has been shown to be a potential contributor to anthropogenic global warming. This drawback, it turns out, is relatively small in the proposed application because the majority of the $CO_2$ used in industry is a byproduct of other processes. In effect, the use of $CO_2$ in industrial processes actually takes advantage of an abundant waste stream rather than creating demand for another pollutant. Therefore, relative to existing hazards of MWF systems to human health and the environment, the incremental global warming potential of $scCO_2$ MWF technology is not substantially significant.

This disclosure teaches new method(s) to lubricate, cool, and/or evacuate chips in metalworking operations using supercritical carbon dioxide ($scCO_2$). Water-based metalworking fluids (MWF) have traditionally been used to perform these functions even though the use of water may lead to high economic, occupational health, and environmental costs. Carbon dioxide, above its critical temperature and pressure, is a tunable solvent that dissolves certain oils. This means that oil can be delivered to interstitial spaces previously inaccessible to water jets. The oil-in-$CO_2$ dispersion can be sprayed out of a nozzle at high speed to deliver the oil and form dry ice in the cutting zone, as shown in FIG. 2B. The rapid expansion of the $CO_2$ leads to cooling at cryogenic temperatures. This rapid expansion of $CO_2$ and/or solutions in $CO_2$ cool significantly as a result of the pressure drop and can reach temperatures below about −80° C. A uniform coating of the solubilized material forms on the spray surface as the $CO_2$ warms and volatilizes. Tapping torque efficiency measurements showed that the new $scCO_2$-based fluids perform up to 20% better than conventional aqueous fluids in terms of tapping torque efficiency. Scanning electron microscope (SEM) images of the chips produced in the tapping operation suggest that $scCO_2$ is a better lubricant delivery mechanism than water, as described further hereinbelow. Further, when delivered in $scCO_2$, straight oils show higher performance than when applied under conventional pressures.

To further illustrate embodiment(s) of the present disclosure, various examples are given herein. It is to be understood that these examples are provided for illustrative purposes and are not to be construed as limiting the scope of the disclosed embodiment(s).

EXAMPLES

Tapping Torque Test Method

The machining performance of the MWFs developed as disclosed herein was measured via the tapping torque test using a MicroTap Mega G8 (Rochester Hills, Mich.) machine tool at a machining speed of 1000 RPM on 1018 steel work pieces that were pre-drilled and pre-reamed with 240 M6 holes (Maras Tool, Schaumburg, Ill.). Tapping was performed using uncoated high-speed steel (HSS) taps (for 1018 steel), with 600 pitch and 3 straight flutes. MWF evaluations were carried out according to ASTM D 5619, the Standard for Comparing Metal Removal Fluids Using the Tapping Torque Test Machine with several modifications made to account for the use of a MWF evaluation test bed that permits multiple evaluations on a single workpiece. MWF performance is reported here as percentage tapping torque efficiency (%), which is an average torque measured during full tool engagement normalized to the average torque measured for a reference MWF. Higher efficiency indicates improved performance in the tapping torque test, and has been shown to be an adequate metric for field performance as discussed below.

Supercritical Carbon Dioxide Test Bed

An experimental test bed was designed by the present inventors to make $scCO_2$-based MWFs and apply them to the cutting region of a tapping torque machine. Referring again to FIG. 1, as previously described, a schematic diagram of the experimental setup is generally designated as 10.

The $CO_2$ was boosted from ~700 psia to supercritical pressures>1070 psia by the pressure booster C. Oil was added to the mixture via the inlet F using a 6-way valve E, and the mixture was stored in a high pressure vessel H. The 25 mL volume vessel H had two sapphire windows for viewing the mixture. The mixture traveled through the pressure vessel H outlet and passed through an automated solenoid valve M before spraying out the nozzle N and onto the tapping torque cutting region. A personal computer L was used to monitor the operating conditions in the high-pressure vessel H, to control the actuation of the solenoid valve M, and to record the data from the tapping torque machine O.

The $scCO_2$-based fluids were applied to the cutting zone simultaneously with the engagement of the tapping tool into the blank workpiece surface. The valve M was opened for 2 seconds to allow the machine O to carry out the entire tapping process while being sprayed with the MWF mixture. For each test using the $CO_2$ fluids, the vessel H was brought to approximately 1500 psia and 35° C., and the contents of the vessel H were allowed to equilibrate for three minutes. As stated hereinabove, photographs of the cutting process using water- and $scCO_2$-based MWFs are shown in FIGS. 2A and 2B, respectively. In both cases, the valve M was released for the duration of the tool engagement. It is seen in FIG. 2A that the aqueous process, delivered under 20 psig, delivers an excess of MWF 12. The setup of FIG. 2B, while delivering less fluid 14 volume, provides greater lubrication and the potential to reduce oil application rates even lower through process optimization. After the cut, the pressure in the vessel H was typically around 900 psia, and more $CO_2$ was fed into the vessel H to return the pressure to approximately 1500 psia. Additional oil was added after every six tapping experiments.

Formulations

The water-based MWF formulations were developed using soybean oil and mineral oil. The water-based formulations are based on a formulation provided by a commercial MWF supplier. A tapping torque efficiency of 100% represents the tapping torque efficiency of a soluble oil MWF purchased from such a commercial MWF supplier. The MWFs were first produced in concentrated form, and then were diluted to a working concentration in deionized water. This formulation procedure is consistent with the manner in which aqueous MWFs are prepared and utilized in practice. The compositions used for each of the aqueous formulations, as well as the formulations according to the present embodiments, are presented in Table 1.

TABLE 1

| Component | $scCO_2$ | Mineral Oil in Water | Soybean Oil MWF microemulsion | Soybean Oil | Soybean Oil in $scCO_2$ |
|---|---|---|---|---|---|
| Soybean Oil | | | 0.72% | 100% | 1% |
| Mineral Oil | | 0.72% | | | |
| Tomadol 91 (Nonionic Surfactant) | | 1.56% | | | |
| Tagat V20 (Nonionic Surfactant) | | | 1.38% | | |
| Dowfax (Anionic Surfactant) | | 0.14% | 0.21% | | |
| Coupler | | 0.07% | 0.10% | | |
| $ScCO_2$ | 100% | | | | 99% |
| Water | | 97.50% | 97.59% | | |

Both of the water-based formulations were made with an anionic and/or nonionic surfactant, but the structure and the amount of surfactant was modified slightly between oils to achieve a stable emulsion. Both water-based formulations contained coupler as a secondary emulsifier.

The $scCO_2$-based formulation was made by injecting soybean oil into a high pressure vessel H at concentrations comparable to those in the water-based fluids. The contents of the vessel H were stirred using a stir bar, and the pressure and temperature were maintained above the critical values for $CO_2$. All of the fluid components were used as delivered from the manufacturer and were subject to the same handling and storage conditions. The base oils used in the formulations were a petroleum-based naphthenic oil and a soybean oil (Alkali Refined Soybean Oil, Cargill Inc., Minneapolis, Minn.). The surfactants for the aqueous formulations were Tagat V20 (a glycerol fatty acid ester-based surfactant commercially available from Degussa-Goldschmidt Chemical Corporation, Hopewell, Va.), Dowfax 3B2 (a disulfonate surfactant commercially available from Dow Chemical, Midland, Mich.), and Tomadol 91-6 (an alcohol ethoxylate surfactant commercially available from Tomah Corporation, Milton, Wis.).

Although not shown in FIG. 3, tests were also run according to the "Tapping Torque Test Method" described herein on 1018 high speed steel (HSS) using deionized water alone as the lubricant. The results of this test showed a tapping torque efficiency of about 50%.

Experimental Results and Discussion

Referring now to FIG. 3, the results of the tapping torque studies show that a soybean oil in $scCO_2$ dispersion (as depicted at 3E) performs roughly 20% better than a soybean oil MWF microemulsion (as depicted at 3C) in terms of tapping torque efficiency. Supercritical $CO_2$ alone (as depicted at 3A) performs roughly as well as a conventional semisynthetic mineral oil in water MWF (as depicted at 3B), and better than water alone. A soybean oil MWF microemulsion (at semi-synthetic MWF oil concentration 0.75%) performs as well as a mineral oil at the same level of a conventional soluble oil (3.4% oil) (not shown). Straight soybean oil, as depicted at 3D, produced improved tapping performance up approximately 12% over the reference fluid (the reference fluid is a soluble, mineral oil-based oil used in industry, with wax added for additional lubrication). The reference fluid is not shown in the figures, but results in 100% tapping torque efficiency.

If soybean oil is delivered to the cutting zone using $scCO_2$ as the carrier, the performance of the fluid increases dramatically. The performance of the soybean oil-in-$scCO_2$ fluid is significantly better than soybean emulsified in water or even straight soybean oil. This suggests that, in addition to applying the lubricant and cooling the cutting region, the $scCO_2$ has tribological benefits that make the cutting process more efficient. In order to help investigate this phenomenon of enhanced lubrication properties offered by MWFs based upon soybean oil in $scCO_2$, scanning electron microscope images of the chips produced during the tapping process were taken.

Figure 4:
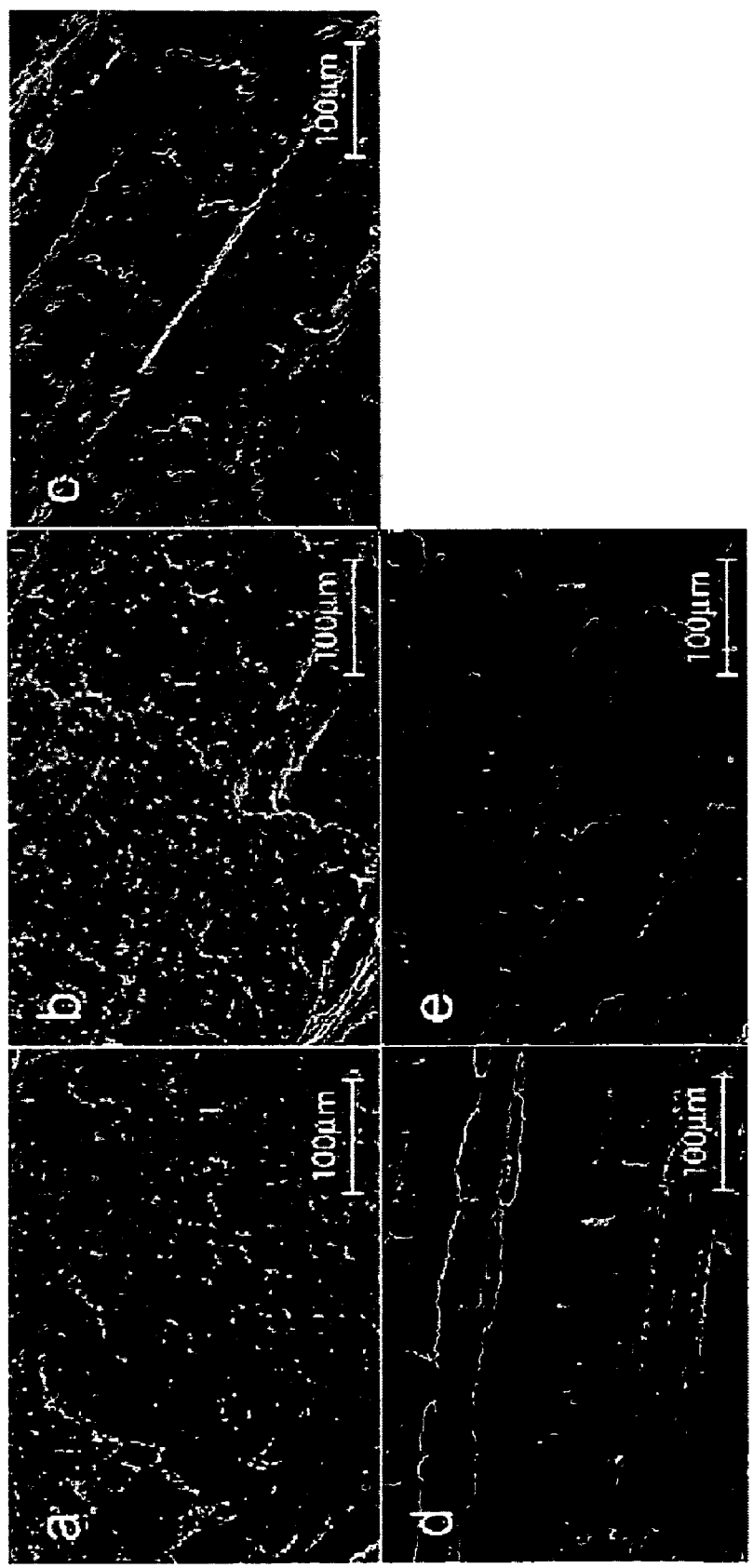
FIG. 4a is a scanning electron micrograph (SEM) showing a magnified image of a chip surface in a piece of 1018 cold rolled steel cut with $scCO_2$ alone.
FIG. 4b is a SEM showing a magnified image of a chip surface in a piece of 1018 cold rolled steel cut with petroleum MWF microemulsion.
FIG. 4c is a SEM showing a magnified image of a chip surface in a piece of 1018 cold rolled steel cut with soybean oil MWF microemulsion.
FIG. 4d is a SEM showing a magnified image of a chip surface in a piece of 1018 cold rolled steel cut with soybean oil alone.
FIG. 4e is a SEM showing a magnified image of a chip surface in a piece of 1018 cold rolled steel cut with soybean oil in $scCO_2$.

Referring now to FIG. 4, generally speaking, FIGS. 4a-4e show that the chips produced in the presence of straight soybean oil and soybean oil in $scCO_2$ have less contact with metal surfaces upon exiting the workpiece. The similarity in the surface morphology between FIGS. 4d and 4e suggest that as the oil dispersion in the $scCO_2$ fluid shoots out of the nozzle, it is penetrating the chip exit zone and filling void spaces on the backside of the chip to effectively carry load and prevent chip-tool contact.

As stated above, each of FIGS. 4a-4e corresponds with one of 3A-3E, respectively. Representative electron microscopy images provided in FIG. 4 clearly show that there is much more metal-to-metal contact in the tapping experiments characterized by lower values of tapping torque efficiency (e.g., petroleum MWF microemulsion, as shown in FIG. 4b, and soybean oil microemulsion, as shown in FIG. 4c) relative to experiments characterized by higher values of tapping torque efficiency (e.g., mixture of $scCO_2$ and soybean oil, as shown in FIG. 4e). For instance, the petroleum-based microemulsion shows wear scars from the cutting process that have been ground down flat into the surface of the chip, as shown in FIG. 4b. The image also indicates striations and scratch marks that are indicative of poor lubrication and metal-to-metal contact. This friction means that more torque must be supplied to perform the tapping operation, resulting in a lower value of tapping torque efficiency as depicted at 3B. In contrast, the $scCO_2$/soybean oil MWF shows much less contact between the chip and workpiece, as shown in FIG. 4e. In this case, the contact area is isolated to a few elevated relief zones on the chip surface that have not been ground down due to the presence of effective lubrication. Since these results are clearly distinguished from the use of soybean oil alone, as depicted in FIG. 4d, it is believed that the pressure of the $scCO_2$ and its ability to carry previously dissolved soybean oil deep into the cutting process, may serve to minimize contact between chip and workpiece. This advantageously results in lower friction and observed torque in the tapping operation.

One of many conclusions drawn from experiments discussed herein is that metalworking fluids made from soybean oil and delivered in $scCO_2$ perform significantly better than traditional oil-in-water emulsions and straight oil MWFs.

Although a few formulations were discussed herein for illustrative purposes, it is to be understood that the demonstrated novelty and/or synergy derived from utilizing $scCO_2$ in combination with lubricants in dissolved, dispersed, and/or emulsified mixtures may be extended to numerous classes of oils, esters, polymers, waxes, and soaps that include, but are not limited to, the following examples: mineral oils, including at least one of napthenic oils, paraffinic oils, and mixtures thereof, vegetable oils, including at least one of soybean oil, rapeseed oil, canola oil, corn oil, sunflower oil, and mixtures thereof, esters, polymers, and/or glycols, including at least one of trimethylpropane esters, polyalkylene glycols, polymerized esters (e.g., monobasic/dibasic acid, fatty amine-based, sulfurized), ethylene oxide/propylene oxide copolymers, synthetic and natural polymers (hydrocarbon, fluorinated, chlorinated), and mixtures thereof, as well as combinations of any of the above.

In addition, the $scCO_2$ lubrication system may include extreme pressure additives for additional lubrication in metal forming or cutting applications with or without primary lubricants that include, but are not limited to, chlorinated paraffins, chlorinated waxes, chlorinated esters, chlorinated fatty acids; sulfurized fats, sulfurized olefins, polysulfides, sulfur-chlorinated compounds, sulfurized sulfonates, phosphate esters, phosphate fatty acids, phosphate amines (e.g., alkyl or aromatic), and/or combinations thereof.

Embodiments of the present method(s) and/or composition(s) using supercritical carbon dioxide ($scCO_2$) are adapted to deliver oil lubricants, boundary lubricants, and extreme pressure lubricants in metalworking applications. The use of $CO_2$ as a lubricant and/or as a lubricant delivery system offers the following non-limitative advantages: improved efficiency and recovery of metalworking, reduction in the amount of raw materials needed to fabricate products; substantial elimination of many, if not all, drawbacks associated with traditional metalworking fluids (one example of which includes their potential for microbial contamination); substantial elimination of the need for biocides that may become a problem due to potential disposal and occupational hazards associated with exposure to biocides in the manufacturing setting; substantial elimination of auxiliary metalworking fluid additives such as chelating agents, which may cause disposal problems; compatibility with a wide variety of traditional and non-traditional base oils such as fluorinated oils and surfactants with high oxidative stability, durability and potential for reuse, vegetable oils with low life cycle burdens relative to fossil alternatives and petroleum-based oils with surfactants; and an efficient recovery system for the oils and/or surfactants using $scCO_2$ as the solvent, which may advantageously lead to a "dry manufacturing" environment in which aqueous and/or organic solvents are no longer necessary. A further advantage is that method(s) and/or composition(s) of the present embodiments may substantially eliminate the disposal of metalworking fluids altogether.

Other advantages include, but are not limited to, reduced/eliminated need for MWF plant circulation and maintenance; applications to otherwise difficult to machine metals, such as hard steels or titanium; and application to products used in medical applications (substantially no toxic materials are used).

While several embodiments have been described in detail, it will be apparent to those skilled in the art that the disclosed embodiments may be modified. Therefore, the foregoing description is to be considered exemplary rather than limiting.

What is claimed is:

1. A system for applying supercritical carbon dioxide for lubricating a metal workpiece for a metalworking process, the system comprising:
    a source of carbon dioxide;
    a pressure booster in fluid communication with the source of carbon dioxide;
    a high-pressure vessel in fluid communication with the pressure booster;
    a source of lubricant in fluid communication with the high-pressure vessel;
    a nozzle in fluid communication with the high pressure vessel; and
    a metal workpiece configured to be lubricated by applying supercritical carbon dioxide thereto during a metalworking process.

2. The system as defined in claim 1 wherein the system is adapted to provide at least one of lubrication, cooling, corrosion inhibition, or chip evacuation during the metalworking process.

3. The system as defined in claim 1, further comprising an automated solenoid valve in fluid communication with, and located between the high pressure vessel and the nozzle.

4. The system as defined in claim 1, further comprising a computer in communication with a heating element and a pressure transducer, the heating element and the pressure transducer in communication with the high-pressure vessel, the computer adapted to control one or more environmental conditions inside the vessel.

5. The system as defined in claim 4, further comprising a thermocouple in communication with the computer and adapted to monitor a vessel temperature.

6. The system as defined in claim 1, further comprising a solenoid valve in communication with, and located between the high-pressure vessel and the nozzle.

7. The system as defined in claim 1, further including a metal working lubricant composition for use therewith, the lubricant composition comprising a mixture of the supercritical carbon dioxide and the lubricant, the composition being non-aqueous and configured to lubricate the metal workpiece during the metalworking process.

8. The system as defined in claim 7 wherein the lubricant is selected from mineral oils, vegetable oils, esters, polymers, glycols, fatty acids, and combinations thereof.

9. The system as defined in claim 7 wherein the lubricant composition further comprises at least one of an extreme pressure additive, a corrosion inhibitor, a boundary lubricant, an antiwear additive, or combinations thereof.

10. The system as defined in claim 9 wherein the extreme pressure additive is selected from chlorinated paraffins, chlorinated waxes, chlorinated esters, chlorinated fatty acids; sulfurized fats; sulfurized olefins; polysulfides; sulfur-chlorinated compounds; sulfurized sulfonates; phosphate esters; phosphate fatty acids; phosphate amines, and combinations thereof.

11. The composition system as defined in claim 7 wherein the lubricant is at least one of dissolved in the supercritical carbon dioxide, dispersed in the supercritical carbon dioxide, emulsified with the supercritical carbon dioxide, or combinations thereof.

12. The composition system as defined in claim 7 wherein the metal workpiece lubricated with the composition has a tapping torque efficiency of about 125%.

* * * * *